United States Patent [19]

Rains

[11] Patent Number: 4,903,719
[45] Date of Patent: Feb. 27, 1990

[54] APPARATUS AND METHOD FOR PROVIDING SECONDARY CONTAINMENT OF FLUIDS IN A PIPING SYSTEM

[76] Inventor: Robert L. Rains, 2135 Napoli Dr., Oxnard, Calif. 93035

[21] Appl. No.: 352,396

[22] Filed: May 15, 1989

[51] Int. Cl.[4] .............................................. F16L 55/18
[52] U.S. Cl. ...................................... 137/15; 137/382; 137/382.5
[58] Field of Search ...................... 137/377, 382, 382.5, 137/15; 220/85 P

[56] References Cited

U.S. PATENT DOCUMENTS

| | | | |
|---|---|---|---|
| 748,720 | 1/1904 | Glazier | 137/382 |
| 754,256 | 3/1904 | Sulivan | 137/382 |
| 1,084,996 | 1/1914 | Wright | 137/382 |
| 1,148,568 | 8/1915 | Bees | 137/382 |
| 3,674,169 | 7/1972 | Miller | 137/382 |
| 4,834,137 | 5/1989 | Kawaguchi et al. | 137/382.5 |

FOREIGN PATENT DOCUMENTS 230529  3/1925  United Kingdom ................ 137/377

Primary Examiner—A. Michael Chambers
Attorney, Agent, or Firm—Blakely, Sokoloff, Taylor & Zafman

[57] ABSTRACT

An apparatus and method for providing secondary containment of fluids along a portion of a piping system having a fluid regulation control device disposed about a portion of that piping system. In one aspect, the invention includes providing a lower housing for containing at least a lower portion of the fluid regulation control device, an upper housing for containing at least part of an upper portion of the fluid regulation control device, and means for sealably and securably attaching the upper housing to the lower housing. The lower housing has an inlet opening formed therein for a sealable introduction of an inlet for the fluid regulation control device. The lower housing also includes an outlet opening formed therein for sealable introduction of an outlet of the fluid regulation control device. The lower housing includes a lower section having a sealed lower end and an open upper end. The upper end has an upper edge surface with recesses thereon forming lower segments of the inlet and outlet openings. The lower housing also includes an upper section having an open upper end and an open lower end. The lower end of the upper section has a lower edge surface which is sealably attachable to the upper edge surface of the lower section. The upper section has recesses thereon forming upper segments of the inlet and outlet openings. The upper housing has an open lower end thereof being sealably and securably attachable to the open upper end of the upper section of the lower housing.

31 Claims, 4 Drawing Sheets

APPARATUS AND METHOD FOR PROVIDING SECONDARY CONTAINMENT OF FLUIDS IN A PIPING SYSTEM

BACKGROUND OF THE INVENTION

1. Field of the Invention

The present invention relates to piping systems for the transportation of toxic and hazardous fluids and more particularly to an apparatus and method for providing secondary containment of fluids in a portion of a piping system having a fluid regulation control device.

2. Description of the Related Art

Over the years, the transport of toxic and hazardous fluids, particularly gases, such as nitrogen, argon, hydrogen, oxygen, silane, phosphine, arsine, and/or various mixed gases, via piping systems, has presented a serious problem for engineers, contractors and others who use or effect transportation of these fluids. When piping systems are used to transport such fluids from one point to another including through or between fluid regulation control devices, such as valves or purge tees, there exists the possibility of a leak occurring in the piping system, thereby allowing hazardous or toxic gases to escape. The resulting risk of death or sickness resulting from inhalation of gases by persons near the piping system, or an explosion should the escape or incendiary fluids ignite has led to stricter OSHA requirements for these piping systems, particularly the requirement of some form of secondary containment.

In partial response to this problem, present applicant has developed a coaxial piping system disclosed in present applicant's co-pending U.S. patent application entitled "Coaxial Piping System", Ser. No. 07/122,537. Ser. No. 7/122,537 is a continuation application of U.S. patent application Ser. No. 06/937,441, now abandoned, of the same title which is a continuation application of U.S. patent application Ser. No. 06/809,584, now abandoned. Briefly, the coaxial piping system disclosed in those patent applications includes an outer conduit, an inner conduit disposed within the outer conduit along the longitudinal axis thereof, and a spacer helically wound about the inner conduit for centering the inner conduit within the outer conduit and permitting fluid flow through the volume between the inner conduit and the outer conduit such that gas traveling through that volume and around the spacer disperses and evenly mixes with the pockets of fluid present in that volume. The spacer also prevents crimping of the inner conduit when the coaxial piping system is bent to conform to the desired geometry of the piping system. Thus, although presenting a partial solution to the need of providing secondary containment, the requirement for secondary containment about fluid regulation control devices, such as valves, disposed about portions of the piping systems, has remained unresolved.

U.S. Pat. No. 2,649,769 issued to E. W. Kaiser entitled "Jacketed Valve", discloses a jacketed valve comprising a valve casing housing having outwardly, openly, and inter-communicating ways therein. The valve casing housing preferably consists of a pair of complementary shaped and sized T-shaped sections. One of the ways is angularly disposed with relation to the others. A valve casing in the housing ways is spaced from the side walls thereof. A cover plate having an opening therein is engaged with the housing over the open outer end of the angularly disposed way. A stuffing box on the cover is cooperatively associated with the cover opening, and a valve stem bonnet connected at one end to the valve casing and extended therefrom into the angularly disposed way and through and beyond the opening in the cover plate and stuffing box is fixedly and supportingly engaged by the stuffing box.

U.S. Pat. No. 3,323,541, issued to T. E. Schneider, Jr., et. al., entitled "Safety Device For Gas Cylinders", discloses a safety device for a gas cylinder of the type providing an externally threaded nub supporting a gas discharge valve and a surrounding area beyond the nub. The safety device includes an internal anchor chamber, internal threads formed on the anchor chamber for threadedly engaging the external threads of the nub to secure the anchor chamber to the nub, an external sealing chamber enclosing the internal anchor chamber, the external sealing chamber defining an open end edge sealingly engageable in abutting relationship with the surrounding area of the cylinder beyond the nub. A threadedly adjustable interconnection is provided between the internal anchor chamber and the external sealing chamber for operably adjusting the location of the external sealing chamber with respect to the internal anchor chamber to force the open end edge of the external sealing chamber in sealing engagement with the surrounding area of the cylinder beyond the nub.

U.S. Pat. No. 3,291,148, issued to C. W. Sloan, et. al., entitled "Tamper Proof Enclosure For Flush Valves", discloses an enclosure for the flush valve for a water flushing system. The water flushing system is of the type having a valve body with a tubular threaded inlet connection, and a tubular threaded outlet connection lying in a plane perpendicular to the plane of the inlet connection; a discharge pipe connected to the outlet connection by a pipe union; a valve mechanism housed in the body between the inlet and outlet connections; a valve actuating member extending outwardly from the body; and, a mounting for the valve actuating member carried by the body.

The enclosure for the particular water flushing system described in that patent reference comprises a shell divided longitudinally into an upper shell portion and a lower shell portion having mating rims arranged and adapted to be brought together to form a unitary casing housing for the valve. The lower shell portion has an opening for the outlet connection and a valve around the opening engageable between the pipe union and the valve body adjacent the outlet connection so that the lower shell portion is secured to and supported by the valve body, complemental inter-engaging fastening means carried by the rims, complemental recesses in the rims of the upper and lower shell portion forming an opening for the mounting for the inlet pipe. One of the openings has a collar formed by complemental portions formed on the upper and lower shell portions. A removable locking member engages the collar and the valve body, the locking member and the inter-engaging fastening means cooperating to retain the casing as a unitary assembly to secure it to the valve body.

U.S. Pat. No. 3,965,916, issued to G. Karis, entitled "Apparatus and Method for Gagging a Relief Valve within a Flue Secured to a Tank" discloses an apparatus including an elongated cylindrical body removably secured into a load-transferring position. An elongated structural member is adjustably extended through this elongated body to a load-transferring position against the upper head of the valve assembly. Consequently, the cylindrical body and structural member gags the valve assembly either by preventing movement of the spring restrained upper end from moving off its seat or by pushing the valve head against the seat if the spring cannot.

U.S. Pat. No. 4,540,019, issued to J. R. Owoc, et. al., entitled "Bellows Sealed Stem for a Rotary Valve", discloses a rotary valve having a bent valve stem enclosed and hermetically sealed by a bent bellows which is internally pressurized during operation of the valve and supported substantially along its entire length by the valve stem to resist lateral deflection and distortion of the bellows and thereby prevent failure of the bellows seal.

U.S. Pat. No. 1,541,801, issued to R. E. Durning, entitled "Valve Lock", discloses a valve lock and enclosing casing having an upwardly disposed neck. A U-shaped member is formed thereon provided with transverse perforations. A valve stem drum is rotatably mounted in the casing neck and a locking key is provided, having a recess formed complementary to the U-shaped member perforations. Locking means is provided, passing through the key and U-shaped member for holding the key in locked position.

U.S. Pat. No. 2,206,707, issued to R. D. Shaw, entitled "Sealing Device", discloses, in combination with a casing structure having an element extending therefrom along which leakage of fluid from the interior of the casing may occur, a sealing means comprising an annular member fused to the casing. The member has lugs with centering pins on diametrically opposite portions. A sealing ring engaging the member and centered on the pins is included in a cup for enclosing such element and sealing it to the annular member. The cup has a flange with lugs engaging the sealing ring and centered on the pins. Means are provided for forcing the cup into fluid tight engagement with the sealing ring and the annular member. Such means comprises a U-shaped yoke having legs pivotly connected to diametrically opposite portions of the casing structure.

Thus, from the above descriptions, it can be seen that prior art methods of attempting to solve the problem of secondary containment of valves, and the like, in piping systems has generally included the use of complicated, expensive devices. Furthermore, these devices are typically specific to a particular valve and cannot be easily integrated into an existing piping system.

As will be disclosed below, the present invention provides an improved apparatus and method for secondary containment which overcomes the disadvantages of the prior art by providing a structure which can be easily assembled about conventional valves, and the like. In addition, the present invention is particularly adaptable to the coaxial piping system disclosed in present applicant's earlier applications.

SUMMARY OF THE INVENTION

An apparatus and method are disclosed for providing secondary containment of fluids along a portion of a piping system having a fluid regulation control device disposed about a portion of that piping system. In one aspect, the invention includes providing a lower housing for containing at least a lower portion of the fluid regulation control device, an upper housing for containing at least part of an upper portion of the fluid regulation control device, and means for sealably and securably attaching the upper housing to the lower housing. The lower housing has an inlet opening formed therein for a sealable introduction of an inlet for the fluid regulation control device. The lower housing also includes an outlet opening formed therein for sealable introduction of an outlet of the fluid regulation control device. The lower housing includes a lower section having a sealed lower end and an open upper end. The upper end has an upper edge surface with recesses thereon forming lower segments of the inlet and outlet openings. The lower housing also includes an upper section having an open upper end and an open lower end. The lower end of the upper section has a lower edge surface which is sealably attachable to the upper edge surface of the lower section. The upper section has recesses thereon forming upper segments of the inlet and outlet openings. The upper housing has an open lower end thereof being sealably and securably attachable to the open upper end of the upper section of the lower housing.

In another aspect, the present invention includes providing secondary containment of fluids along a portion of a coaxial piping system having a fluid regulation control device disposed about a portion of the coaxial piping system. A lower housing is provided for containing a lower part of the fluid regulation control device. The lower housing has surfaces on its side wall which form at least two lower housing openings at opposite sides of the lower housing. An outer conduit of the coaxial piping system is sealably and securely attached to the surfaces of the lower housing which form the at least two lower housing openings. An inner conduit of the coaxial piping system is provided which is located within the outer conduit. The inner conduit has a surface in its side wall forming an inner conduit opening. The opening is secured to an inlet of the fluid regulation control device for providing a direct fluid communication relationship between the inlet of the fluid regulation control device and the inner conduit. The outer conduit further has a surface forming an outer conduit opening therein. The surface forming that outer conduit opening is securely attached to a portion of the surface of the lower housing forming the at least two lower housing openings. The inlet of the fluid regulation control device fits within the outer conduit opening, the outer conduit opening providing a fluid communication relationship between the interior of the lower housing and the spaces between the inner conduit and the outer conduit. An upper housing is provided for containing at least part of an upper portion of the fluid regulation control device. The upper housing has an open lower end thereof being sealably and securably attachable to the open upper end of the lower housing. Means are provided for forming such a sealable and secure attachment.

BRIEF DESCRIPTION OF THE DRAWINGS

The same elements or parts throughout the figures of the drawings are designated by the same reference characters, while equivalent elements bear a prime designation.

DETAILED DESCRIPTION OF THE PREFERRED EMBODIMENTS

Figure 1:
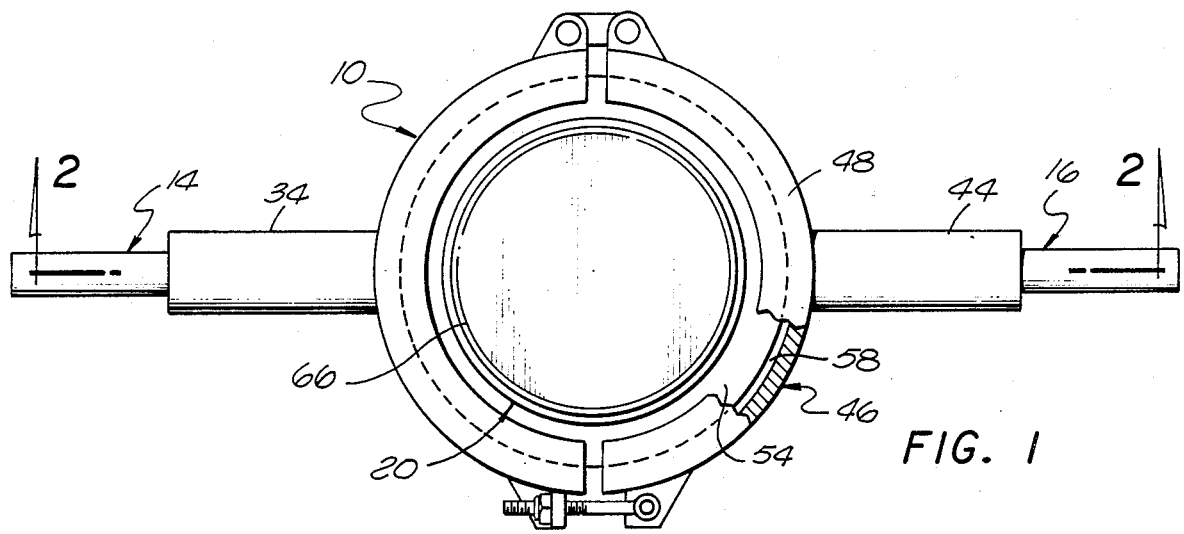
FIG. 1 is a top view, partially cut away, of a preferred embodiment of the present invention, shown mounted about a conventional Nupro "B" Series Valve.
Figure 2:
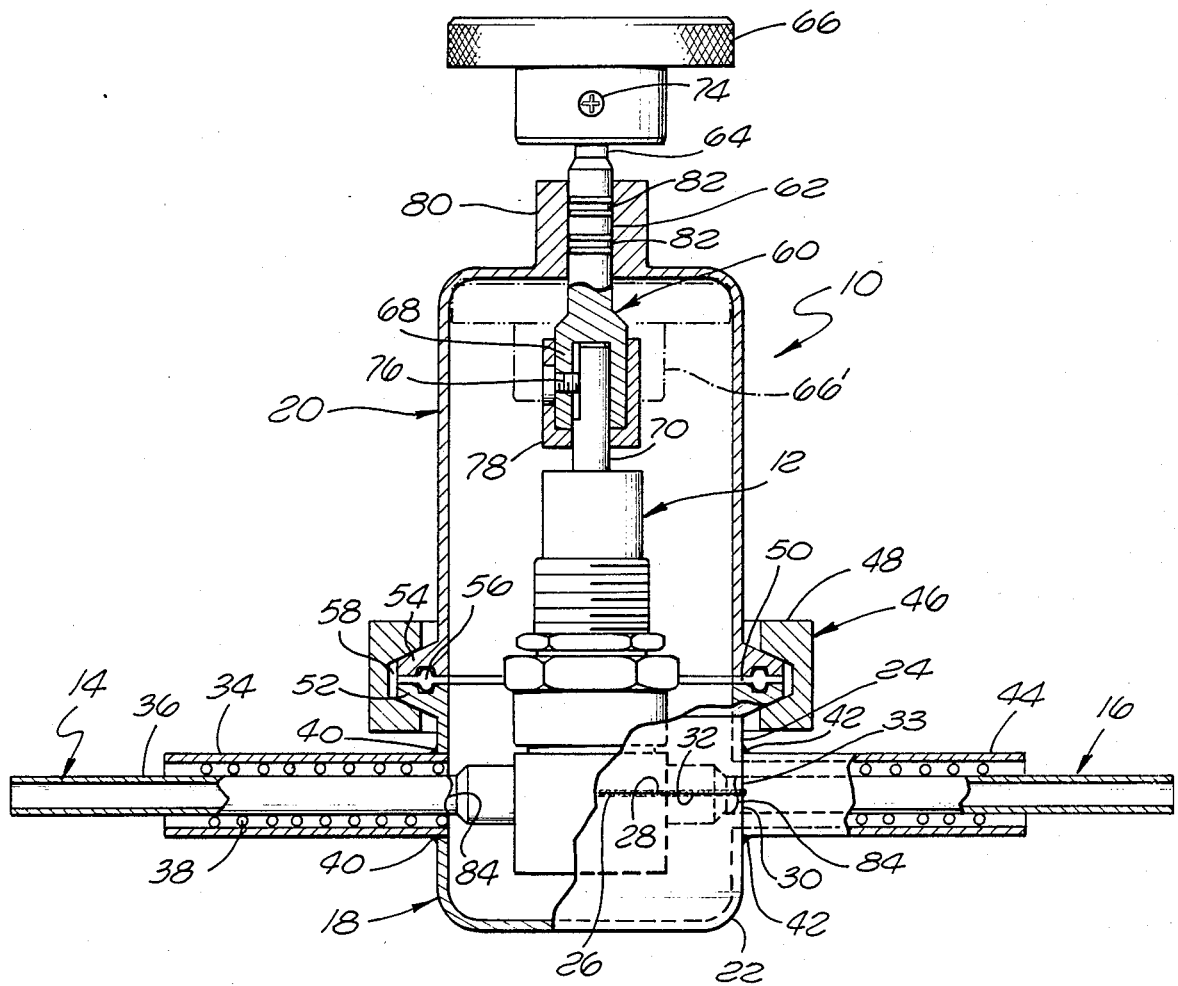
FIG. 2 is a side elevation view of the invention illustrated in FIG. 1, partially cut away, taken along line 2—2 of FIG. 1.

Referring to the drawings and the characters of reference marked thereon, FIGS. 1 and 2 illustrate a preferred embodiment of the apparatus of the present invention, designated generally as 10. The apparatus 10 is shown fabricated about a fluid regulation control means; in this preferred embodiment, a valve including a valve body, designated generally 12, a valve inlet designated generally 14, and a valve outlet designated generally 16.

As noted, the apparatus 10 is particularly adapted for use with conventional valves, such as the Nupro "B" Series ¼" High Purity Valve illustrated in FIGS. 1 and 2. For this reason, the invention will be described in connection with this particular use. However, it is emphasized, as will be more fully explained below, that the invention has broader utility, for example, with use with a purge tee. It may also be utilized with relationship to regulators, flow restrictors, flow monitors, gages, filters, switches and numerous other fluid regulator control devices used in a piping system. In view of these broader utilities of the invention, it is understood that this described application involving this type of conventional valve is purely illustrative and not limiting in nature.

Referring now specifically to FIG. 2, the apparatus 10 includes a lower housing, designated generally as 18, and an upper housing, designated generally as 20. As can be seen by reference to FIG. 1, both the valve body 12 and the lower and upper housings, 18, 20, have generally circular crosssections.

The lower housing 18 includes a lower section 22 and an upper section 24. These sections, 22, 24, are welded at a weld seam 26. The lower section 22 has a sealed lower end and an open upper end with an upper edge surface 28. The upper edge surface 28 includes recesses. A recess on the outlet end of the upper edge surface 28 of the lower housing is designated 30. (The recesses form lower segments of the inlet and outlet openings, as will be described below.)

The upper section 24 of the lower housing 18 has both an open upper end and an open lower end. The lower end of the upper section 24 has a lower edge surface 32 which is, as noted, welded to the upper edge surface 28 of the lower section 22. The lower edge surface 32 of the upper section 24 has recesses formed thereon (e.g. see recess 33) forming upper segments of the inlet and outlet openings, as will be described below.

The inventive concept of the present invention is particularly adaptable for use with the coaxial piping system disclosed in present applicant's co-pending U.S. patent application entitled "Coaxial Piping System", Ser. No. 122,537. As noted, Ser. No. 122,537 is a continuation application of patent application Ser. No. 937,441, now abandoned, of the same title which is a continuation application of patent application Ser. No. 809,584, abandoned. The subject matter in these patent applications regarding this coaxial piping system is hereby incorporated by reference. Briefly, still referring to FIG. 2, the coaxial piping system includes an outer conduit 34, an inner conduit 36 disposed within the outer conduit 34 along the longitudinal axis thereof, and a spacer 38 helically wound about the inner conduit 36 for centering the inner conduit 36 within the outer conduit 34 and permitting fluid flow through the volume between the inner conduit 36 and the outer conduit 34 such that gas traveling through that volume and around the spacer 38 disperses and evenly mixes with the pockets of fluid present in that volume. The helical spacer 38 prevents crimping of the inner conduit 36 and promotes substantial conformity of the same to the dimensions of the outer conduit 34, when the coaxial piping system is bent to a desired shape. The outer conduit 34 is typically an add-on to a conventional pipe, i.e. inner conduit 36. The outer inlet conduit 34 and outer outlet conduit 44 are connected at weld seams 40, 42 to the recessed segments 30, 33, as shown.

The upper housing 20 is connected to the lower housing 18 by a clamping assembly, designated generally as 46. The clamping assembly 46 includes a two-segment clamp 48 and a rubber gasket 50. The upper end of the upper section 24 includes a radially outward extending ferrule 52. The ferrule 52 may be an integral portion of the upper section 24 or may be an attachment thereto. The upper surface of ferrule 52 opposes the bottom surface of a complementary shaped ferrule 54 extending on the lower end of the upper housing 20. The rubber gasket 50 may be such as those trademarked under the name "VITON" and is located between the ferrules 52, 54. A bead 56, of gasket material, is molded to the gasket 50 for providing a precision, leak-tight seal. A space 58 is provided to provide room for expansion of the gasket in response to its compression during the tightening of clamp 48.

In the embodiment shown in FIGS. 1 and 2, the apparatus 10 includes a stem extension assembly, designated generally as 60. The utilization of such an assembly 60 allows a pre-existing conventional valve to be easily converted for use with the apparatus 10. The stem extension assembly 60 includes a substantially cylindrical shaft portion 62 having an upper end 64 sized to operably mate with the handle 66 of the conventional valve 12. The shaft portion 62 has a lower end 68 with an increased diameter. The lower end 68 has a centrally disposed, axially extending opening being sized to operably mate with the upper end of a valve stem 70 of the conventional valve. (The handle 66 has been previously disconnected from the valve stem 70, as will be discussed below. The previous handle position is shown by phantom lines 66'.)

Apparatus 10 includes means 74 for securely attaching the handle 66 to the shaft 64. Means 74 may include, for example, a set screw. Assembly 60 also includes means 76 for securely attaching the conventional stem 70 to the lower end 68 of the shaft 62. Such means 76 may also include a set screw, as shown. A guide ring 78 is located about the periphery of the lower end 68 of the shaft portion 62 for providing precise alignment of the lower end 68 of the shaft portion 62 and the conventional valve stem 70. Shaft portion 62 is disposed within an axially disposed extended collar portion 80 of the upper housing 20. Dual O-rings 82 are provided for the shaft portion's sealing engagement therein. The apparatus 10 has been described in terms of attachments by way of weld seams, thus assuming that the upper and lower housings 18, 20 and inner and outer conduits 36, 34 depicted in the figures are formed substantially of metallic materials. These materials are typically stainless steel, aluminum, or carbon steel. However, it is emphasized that these components may be formed of other suitable materials such as plastic material, for example, polyvinyl chloride (PVC), polyvinylidene-dien-fluoride (PVDF), or synthetic resin polymers such as "TEFLON". In these instances, suitable bonding materials such as epoxy resin would be utilized at the seams. Obviously, the materials used should be resistant to the fluid transported through the piping system.

A sequential explanation of construction of the apparatus 10 is provided as follows:

The valve handle 66' (e.g. shown in phantom), which is attached to a conventional valve stem 70, is removed from that valve stem 70. The Nupro "B" Series ¼" High Purity Valve used in this implementation includes ¼" process tubes (e.g. inner conduits). Extensions are welded onto the process tubes, as shown at weld seams 84, to eventually form an end-to-end inner conduit length of 7 ⅜". (The end portions of the inlet inner conduit and the outlet inner conduit, which will eventually extend beyond the length of the outer conduits, allow the use of an orbital welding head.) The lower section 22 of the lower housing 18 is positioned, as shown in FIG. 2, so that the inner conduits 36 are aligned with the recesses 30 in the upper end of the lower section 22. The upper section 24 of the lower housing 18 is then positioned and tack welded to the lower section 22 at weld seam 26. Thus, the lower housing becomes a unitary structure. The outer conduit tubes 34, which may, for example be ½" coax tubes, are then positioned and welded as shown at locations 40, 42 and the springs 38 positioned.

The stem extension assembly 60 is then connected to the existing valve stem 70, as further shown in FIG. 2. The upper housing 20 can then be positioned over the lower housing 18, the shaft portion 62 being inserted through the collar 80. The clamping assembly 46 may then be applied and adjusted to the desired tightness, and the handle 66 connected to the shaft portion 64. Thus, by merely unclamping the clamping assembly 46 and removing the set screw 74 in the handle 66, the upper housing 20 can be removed, exposing the valve 12 for any required servicing.

In use, if a leak develops in the inner conduit 36 or valve 12, the toxic or otherwise hazardous gas transported by the inner conduit 36 or valve 12 escapes into the volume between the inner conduit 36 and the outer conduit 34 and/or into the volume between the valve 12 and the housings 18, 20. The system can be purged by injecting a purging gas into these volumes.

The aforementioned description of the present invention has been presented with respect to a specific type of valve; however, as noted, it is emphasized that the inventive concepts are generally applicable to various shapes and sizes of valves.

Figure 3:
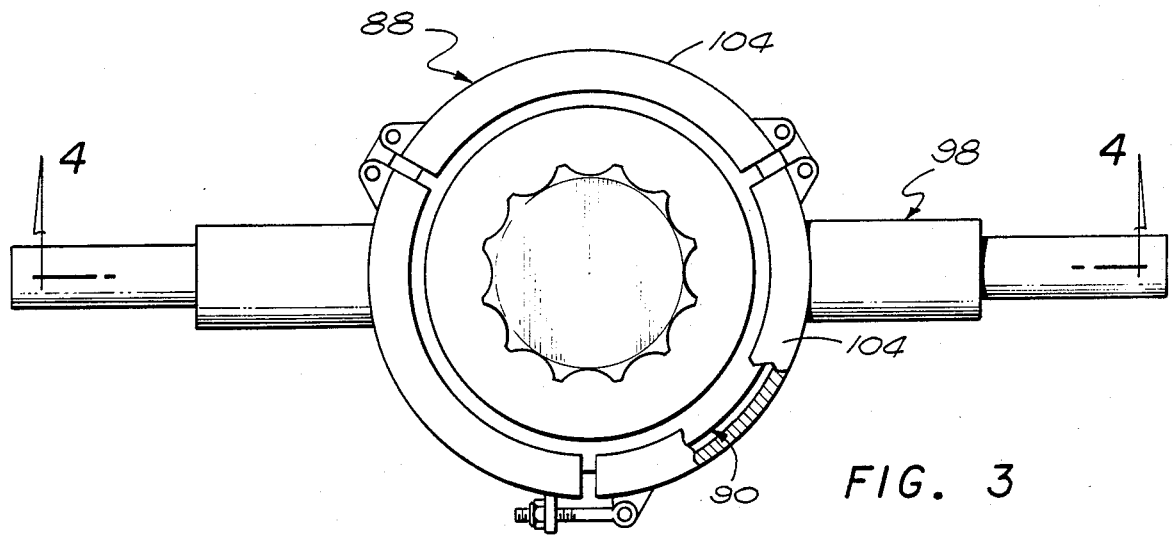
FIG. 3 is a top view, partially cut away, of another preferred embodiment of the present invention, shown mounted about a conventional Eagle Bellows Seal Globe Valve.
Figure 4:
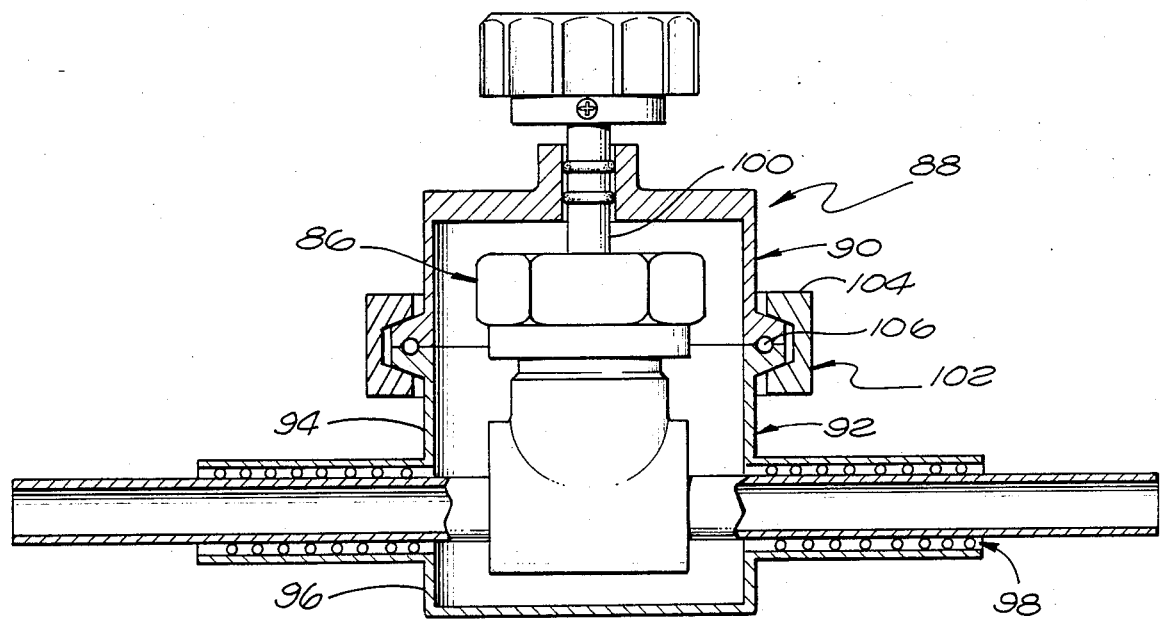
FIG. 4 is a side elevation view of the invention illustrated in FIG. 3, taken along line 4—4 of FIG. 3.

For example, referring now to FIGS. 3 and 4, utilization of the above principles is illustrated with respect to an Eagle Bellows Seal Globe Valve, designated generally as 86. (The utilization of different valves depends on, for example, specific flow rate requirements, sealing requirements, and sanitation requirements.) As can be seen by reference to FIGS. 3 and 4, the apparatus designated generally as 88, as in the previous embodiment, includes an upper housing designated generally as 90, and a lower housing designated generally as 92. The lower housing 92 includes an upper section 94 and a lower section 96. The upper and lower sections 94, 96 are welded together at a weld seam (not shown), as in the previous embodiment. A coaxial piping system 98 may be used, as shown; however, such a use of a coaxial piping is not required for implementation of the presently described inventive concepts. Furthermore, as can be seen by reference to FIGS. 3 and 4, the requirement of a stem extension assembly may be obviated. A stem extension 100 is fabricated which is installable into the valve 86. A clamp assembly 102, similar to the clamp assembly 46 utilized in the FIG. 1 and 2 embodiment is used; however, in the present embodiment, the clamp 104 is shown with three segments. Furthermore, the flat gasket 50 of the previous embodiment has been substituted by a ring gasket 106.

Figure 5:
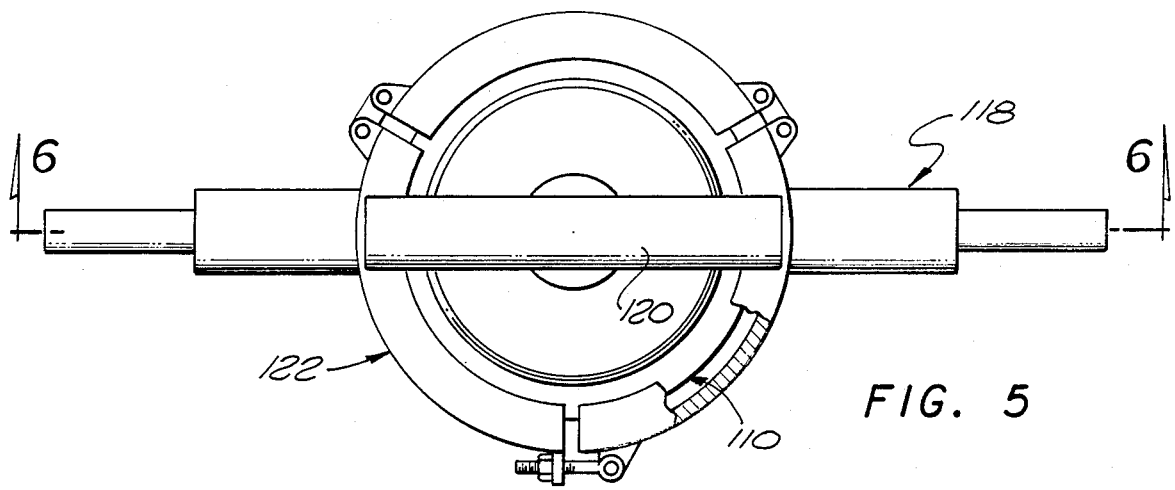
FIG. 5 is a top view, partially cut away, of another preferred embodiment of the present invention, shown mounted about a conventional Nupro "U" Series Bellows Valve.
Figure 6:
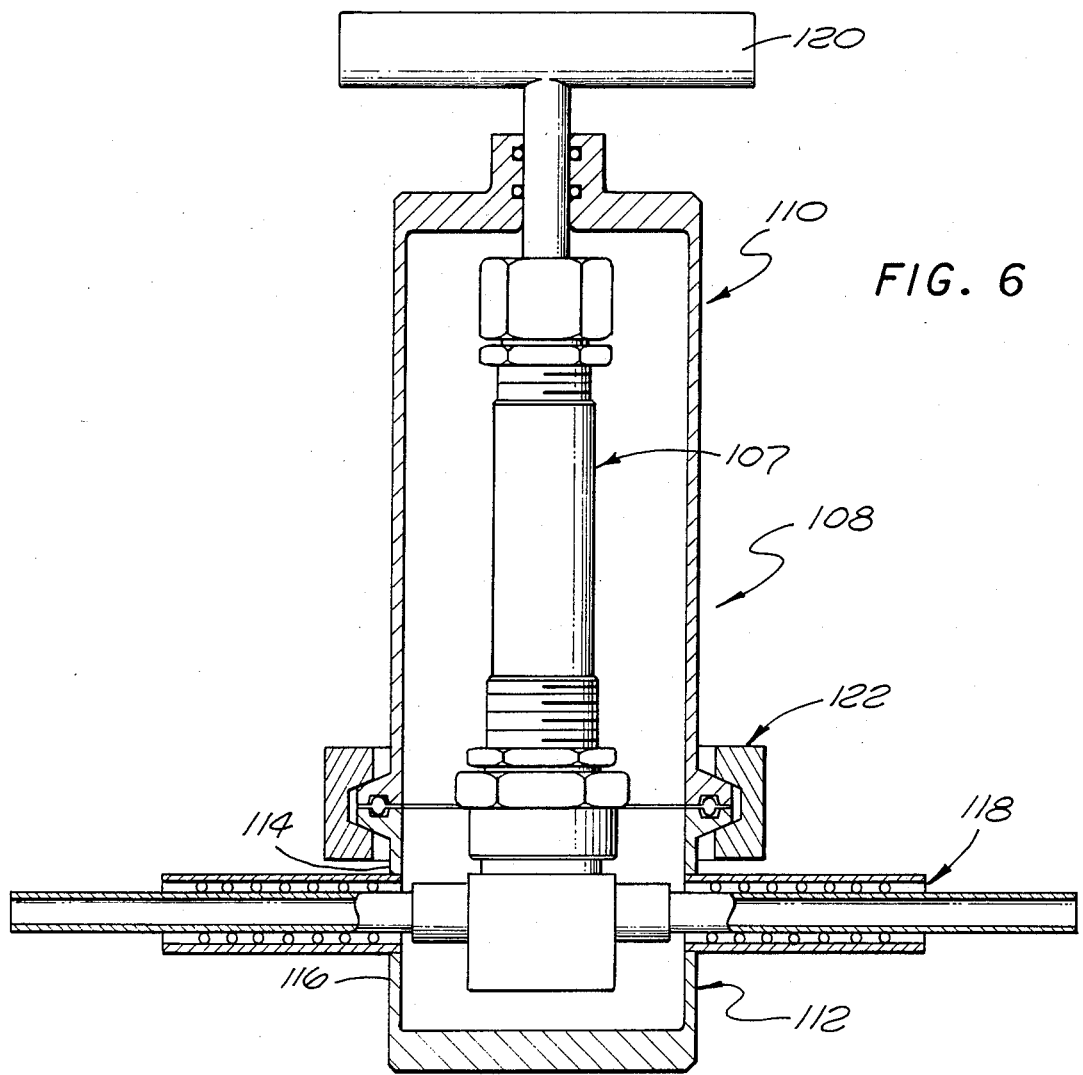
FIG. 6 is a side elevation view of the invention illustrated in FIG. 5, taken along line 6—6 of FIG. 5.

Referring now to FIGS. 5 and 6, the inventive concepts of the present invention are shown with reference to a Nupro "U" Series Bellows Valve, designated generally as 107. In this instance, as in the previous embodiments, the apparatus designated generally as 108, includes an upper housing 110 and a lower housing 112. The lower housing 112 includes an upper section 114 and a lower section 116, the sections 114, 116 being integrally attached, preferably by a weld seam (not shown). A coaxial conduit arrangement 118 is illustrated. A T-handle 120 and three-segment clamp assembly 122 are utilized.

Figure 7:
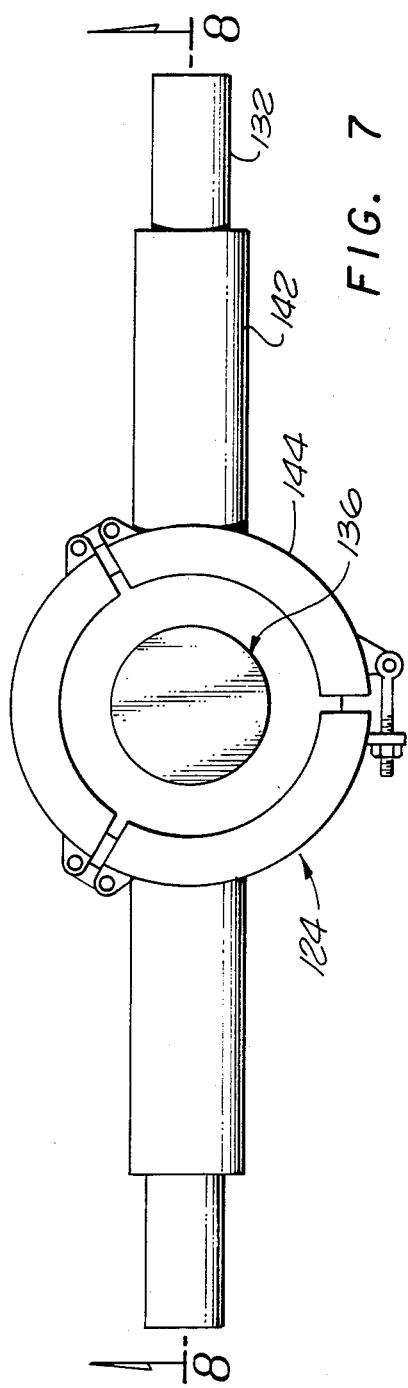
FIG. 7 is a top view of another preferred embodiment of the present invention, as applied to a purge tee.
Figure 8:
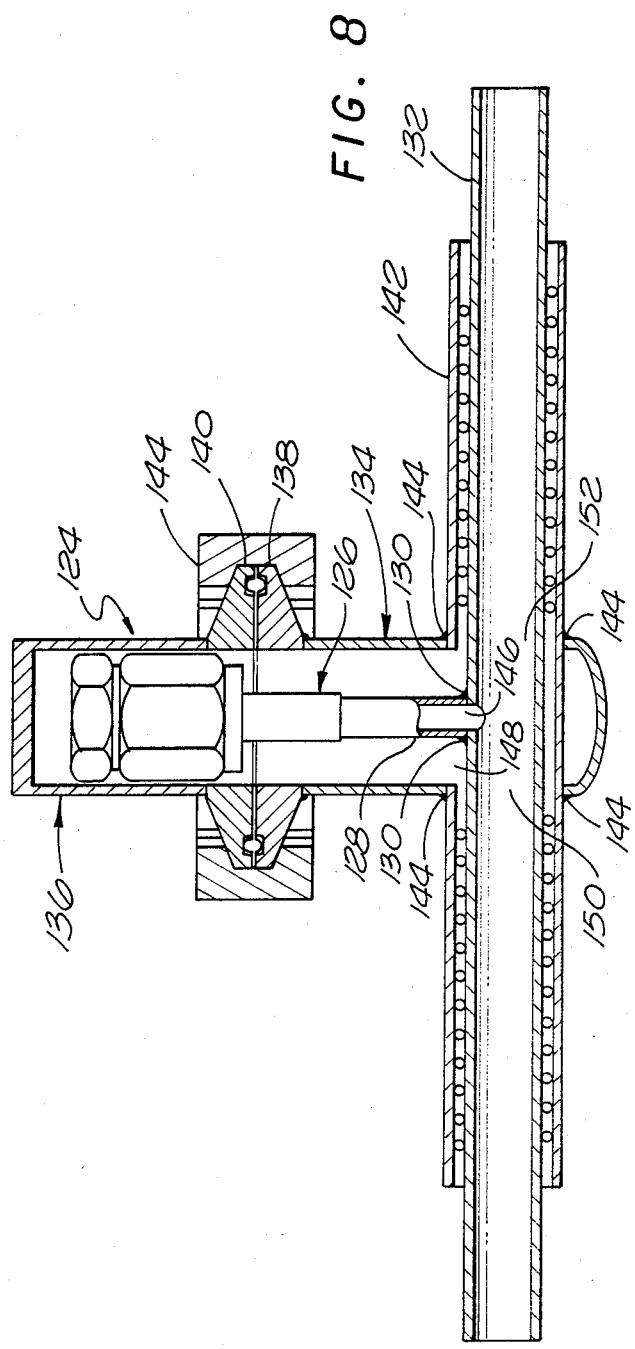
FIG. 8 is a side elevation view of the invention illustrated in FIG. 7, taken along line 8—8 of FIG. 7.

FIGS. 7 and 8 illustrate that the present invention is not limited to valves and the inventive concepts can be extended for use with other forms of fluid regulation control devices in a piping system. An arrangement is shown illustrating the apparatus, designated generally as 124, disposed about a purge tee, designated generally 126. Specifically, a conventional ¼" VCR Purge Port is shown. In this embodiment, the device 126 includes a vertically disposed inlet 128 which is preferably welded at location 130, to inner transverse conduit 132. As in the previous embodiments, the apparatus 124 includes a lower housing 134 and an upper housing 136. In this instance, the lower ferrule 138 and upper ferrule 140 are distinct elements welded to the main portions of the upper and lower housings 136, 134. The outer transverse conduit 142 is attached, preferably welded, at location 144, to the lower housing 134. In this instance, the apparatus 124 encases the entirety of the fluid regulation control device 126. A three-segment clamp 144 is utilized.

In construction, an inner conduit 132 is provided and a hole 146 is drilled in a portion of the side wall thereof which is sized to substantially match the diameter of the vertically disposed inlet 128 of the fluid regulation control device 126. Thus, for example, with the ¼" Purge Port illustrated (marketed under the trademark "VCR"), approximately a ¼" diameter hole is drilled in the ½" inner conduit 132. A hole 148 is also drilled in a portion of the side wall of the outer transverse conduit 142, which is sized to substantially match the diameter of the portion of the lower housing 134.

The inner conduit 132 is then positioned within the outer conduit 142 and the resulting assembly placed within the openings 150, 152 formed within the opposite sides of the lower housing 134, the openings 146, 148 being in substantial alignment. The inlet 128 is then welded as shown at locations 130, to the inner conduit 132. The lower end of the lower housing 134 is then welded at the locations 144 to the outer conduit 142. Thus, a fluid communication relationship is formed between the space between the outer conduit 142 and the inner conduit 132, and the interior of the lower housing 134 which is exterior to the device 126. Furthermore, a fluid communication relationship is formed between the inlet 128 and space within the inner conduit 132. The upper housing 136 can then be clamped to the lower housing 134, as shown in the figures, and the apparatus 124 is thereby formed.

Obviously, many modifications and variations of the present invention are possible in light of the above teachings. It is therefore to be understood that, within the scope of the appended claims, the invention may be practiced otherwise, then, as specifically described.

For example, the clamping assembly described may be substituted for an apparatus in which the upper and lower housings have lower and upper edges, respectively, forming flanges which are securably connected by a plurality of spaced bolts and nuts. The flanges are preferably separated by a metal gasket. The advantages of such an arrangement includes the ability to sustain high pressures and utilize commercially available components.

In another example, the lower housing has threads located on an upper end thereof. A nut with an upper flange is threaded into the upper end of the lower housing and engages the upper flange on the lower housing. A gasket is provided to ensure proper sealing. The outer surface of the nut is preferably knurled for ease in tightening. The advantages of this arrangement include the fact that it allows quick assembly and disassembly, it is light weight, and it is compact.

In yet another example of how the specific embodiments described above may be modified yet remain within the scope of the teachings of the present invention, the stem extension assembly may be substituted by a yoke/cam assembly. In this instance, a cam is connected to the end of the original stem (preferably by a set screw). A yoke is provided which is designed to engage the cam and control the movement thereof. The yoke is secured to a stem extension, preferably by welding. The advantages of this arrangement includes the fact that misalignment is suitably accommodated. Furthermore, when the upper housing is removed, the stem extension an yoke are also removed, as one assembly.

Other variations of the stem extension assembly might include the use of a flexible, bellows-type coupling between the stem extension and the original stem to accommodate misalignment.

Interconnection of the various parts may be accomplished in the above-described embodiments by well-known techniques such as gas tungsten arc welding, gas metal arc welding, electron beam welding, laser welding, gas welding, arc welding, brazing, soldering, or through the use of adhesives.

What is claimed and desired to be secured by Letters Patent of the United States is:

1. An apparatus for providing secondary containment of fluids along a portion of a piping system having a fluid regulation control device disposed about a portion of said piping system, comprising:
    (a) a lower housing for containing at least a lower portion of said fluid regulation control device, said lower housing having an inlet opening formed therein for a sealable introduction of an inlet for said fluid regulation control device, and an outlet opening formed therein for sealable introduction of an outlet for said fluid regulation device, said lower housing including,
        (i) a lower section having a sealed lower end and an open upper end, said upper end having an upper edge surface with recesses thereon forming lower segments of said inlet and outlet openings; and
        (ii) an upper section having an open upper end and an open lower end, the lower end of the upper section having a lower edge surface being sealably and securably attached to the upper edge surface of said lower section, said upper section having recesses thereon forming upper segments of said inlet and outlet openings; and
    (b) an upper housing for containing at least part of an upper portion of said fluid regulation control device, said upper housing having an open lower end thereof being sealably and securably attachable to the open upper end of the upper section of said lower housing; and
    (c) means for sealably and securably attaching said upper housing to said lower housing.

2. The apparatus of claim 1 wherein said piping system includes a coaxial piping system having said inlet and said outlet for the fluid regulation device comprising an outer inlet conduit, and an inner inlet conduit, an outer outlet conduit, and an inner outlet conduit, said conduits for containing gases, said inner conduits being integrally attached to said fluid regulation device and said outer conduits being sealably and securably attachable to said upper and lower segments of said inlet and outlet openings.

3. The apparatus of claim 2 wherein said coaxial piping system further includes means for centering said inner conduits within said outer conduits.

4. The apparatus of claim 3 wherein said outer conduits are sealably and securably attached to said upper and lower segments of said inlet and outlet openings by means of a weld seam.

5. The apparatus of claim 1 wherein the upper edge surface of the lower section of said lower housing is sealably attached to the lower edge surface of the upper section of said upper housing by means of a weld seam.

6. The apparatus of claim 1 wherein said means for sealably and securably attaching said upper housing to said lower housing includes clamping means.

7. The apparatus of claim 6 wherein said lower and upper housings each have generally circular cross-sections.

8. The apparatus of claim 7 wherein,
    the upper end of said upper section includes a first radially outward extending ferrule; and
    the lower end of said upper housing includes a second radially outward extending ferrule, said first and second ferrules having opposing complementary surfaces.

9. The apparatus of claim 8 further including a gasket locatable between said ferrules.

10. The apparatus of claim 9 including a clamp disposed about the periphery of said ferrules.

11. The apparatus of claim 1 wherein said fluid regulation control device includes:
    a conventional valve body;
    a conventional valve stem attached to said valve body;

a stem extension assembly attached to said conventional valve stem; and a valve handle attached to said stem extension assembly.

12. The apparatus of claim 11 wherein said upper housing includes a stem extension opening formed therein for introduction of said stem extension assembly.

13. The apparatus of claim 12 wherein said stem extension assembly includes:
   (a) a substantially cylindrical shaft portion having an upper end sized to operably mate with the handle of the conventional valve utilized, said shaft portion having a lower end with an increased diameter and a centrally disposed axially extending opening being sized to operably mate with the upper end of said conventional valve stem;
   (b) means for providing the operable mating of said handle with the upper end of the cylindrical shaft portion;
   (c) means for providing the operable mating of the upper end of said conventional valve stem with the lower end of said shaft portion; and
   (d) means for sealably securing said shaft within said stem extension opening.

14. The apparatus of claim 13 wherein said upper housing includes an extended collar portion forming said stem extension opening, said means for sealably securing said shaft within said stem extension opening including a plurality of O-rings.

15. The apparatus of claim 13 wherein means for providing the operable mating of said handle with the upper end of the cylindrical shaft portion includes screw means.

16. The apparatus of claim 13 wherein said means for providing the operable mating of the upper end of said conventional valve stem with the lower end of said shaft portion includes screw means.

17. The apparatus of claim 13 wherein said stem extension assembly further includes a guide ring located about the periphery of the lower end of said shaft portion for providing precise alignment of said lower end of said shaft portion and said conventional valve stem.

18. An apparatus for providing secondary containment of fluids along a portion of a piping system having a valve disposed about a portion of said piping system, said valve including a valve body, an inlet, an outlet, a valve stem, and a removable handle, the apparatus comprising:
   (a) a lower housing for containing a lower portion of said valve, said lower housing having an inlet opening formed therein for a sealable introduction of said inlet of said valve, and an outlet opening formed therein for a sealable introduction of said outlet of said valve, said lower housing including;
      (i) a lower section having a sealed lower end and an open upper end, said upper end having an upper edge surface with recesses thereon forming lower segments of said inlet and outlet openings; and
      (ii) an upper section having an open upper end and an open lower end, the lower end of the upper section having a lower edge surface being sealably attached to the upper edge surface of said lower section, said upper section having recesses thereon forming upper segments of said inlet and outlet openings; and
   (b) an upper housing for containing at least part of an upper portion of said valve body and valve stem, said handle having previously been removed from said valve stem, said upper housing including;
      (i) a lower end having a first surface thereon forming a first opening, said first surface being sealably and securably attachable to the upper end of the upper section of said lower housing, and
      (ii) another end having a second surface thereon forming a second opening, said second opening for introduction of a valve stem extension assembly, said valve stem extension assembly for connection at, a lower end thereof, to an upper end of said valve stem and for connection at, an upper end thereof, to said handle; and
   (c) means for sealably and securably attaching said upper housing to said lower housing.

19. The apparatus of claim 18 wherein said piping system includes a coaxial piping system having said inlet and said outlet for said valve comprising an outer inlet conduit, an inner inlet conduit, an outer outlet conduit, and an inner outlet conduit, said conduits for containing gases, said inner conduits being integrally attached to said valve body and said outer conduits being sealably and securably attachable to said upper and lower segments of said inlet and outlet openings.

20. The apparatus of claim 19 wherein said coaxial piping system further includes means for centering said inner conduit within said outer conduit.

21. An apparatus for providing secondary containment of fluids along a portion of a coaxial piping system having a fluid regulation control device disposed about a portion of said coaxial piping system, comprising:
   (a) a lower housing for containing a lower part of said fluid regulation control device, said lower housing having surfaces in its side wall which form at least two lower housing openings at opposite sides of said lower housing;
   (b) an outer conduit of said coaxial piping system being sealably and securely attached to said surfaces of the lower housing which form said at least two lower housing openings;
   (c) an inner conduit of said coaxial piping system located within said outer conduit, said inner conduit having a surface in its side wall forming an inner conduit opening, said surface forming said inner conduit opening being secured to an inlet of said fluid regulation control device for providing a direct fluid communication relationship between said inlet and said inner conduit,
   said outer conduit further having a surface in its side wall forming an outer conduit opening therein, said surface forming said outer conduit opening being securely attached to a portion of the surface of the lower housing forming said at least two lower housing openings, said inlet of the fluid regulation control device fitting within said outer conduit opening, said outer conduit opening providing a fluid communication relationship between the interior of said lower housing and spaces formed between the inner conduit and the outer conduit;
   (d) an upper housing for containing at least part of an upper portion of said fluid regulation control device, said upper housing having an open lower end thereof being sealably and securably attachable to an open upper end of said lower housing; and (e) means for sealably and securably attaching said upper housing to said lower housing.

22. The apparatus claim 21 wherein said upper housing includes a sealed upper end, said fluid regulation control device being a purge tee.

23. A method for providing secondary containment of fluids along a portion of a piping system having a fluid regulation control device disposed about a portion of said piping system, comprising the steps of:
(a) providing said fluid regulation control device with at least an inlet and an outlet;
(b) positioning a lower section of a lower housing about at least a lower portion of said fluid regulation control device, said lower section having a sealed lower end and an open upper end, said upper end having an upper edge surface with recesses thereon, said inlet and outlet being positioned adjacent respective recesses;
(c) positioning a lower end of an upper section of said lower housing adjacent said upper end of said lower section, the lower end of said upper section having a lower edge surface with recesses formed thereon cooperatively mating with the recesses in said upper edge surface of said lower section to form inlet and outlet openings for said inlet and outlet;
(d) sealably and securably attaching said upper section to said lower section;
(e) sealably and securably attaching said inlet and outlet to surfaces of said upper and lower sections forming said recesses; and
(f) sealably and securably attaching an upper housing to said lower housing.

24. The method of claim 23 wherein the step of positioning said lower section and said upper section includes positioning a lower section and upper section which cooperatively mate to enclose an outer inlet conduit and an outer outlet conduit of a coaxial piping system, said coaxial piping system further including an inner inlet conduit and an inner outlet conduit, said inner inlet conduit supplying fluid to said fluid regulation control device and said inner outlet conduit receiving fluid from said fluid regulation control device.

25. The method of claim 24 wherein the step of sealably and securably attaching said inlet and outlet includes welding said outer conduits to the associated surfaces of said upper and lower sections forming said recesses.

26. The method of claim 25 further including the step of providing means for centering said inner conduits within said outer conduits.

27. The method of claim 23 wherein said upper section is sealably and securably attached to said lower section by a welding process.

28. The method of claim 23 wherein the step of sealably and securably attaching upper housing to said lower housing includes clamping said housings together.

29. The method of claim 23 wherein the ste of providing said fluid regulation control device includes providing such a device including a conventional valve body, a conventional valve stem attached to said valve body, and, a valve handle attached to said conventional valve stem, said handle being removed from said conventional valve stem prior to the positioning of said fluid regulation control device within said lower and upper housings, and a stem extension assembly being attached to said conventional valve stem, said handle being attached to said stem extension assembly after the valve body, conventional valve stem and stem extension assembly have been positioned within said housings, a shaft portion of said stem extension assembly extending through a stem extension opening formed in said upper housing.

30. A method for providing secondary containment of fluids along a portion of a coaxial piping system having a fluid regulation control device disposed about a portion of said coaxial piping system, comprising the steps of:
(a) providing a lower housing, said lower housing having a side wall with surfaces therein forming at least two lower housing openings at opposite sides of said lower housing;
(b) providing an outer conduit of said coaxial piping system, said outer conduit having a side wall with a surface thereon forming at least one outer conduit opening, said outer conduit being sized to allow the outer conduit to be securely fitted within the lower housing openings;
(c) providing an inner conduit of said coaxial piping system, said inner conduit having a side wall with a surface thereon forming an inner conduit opening, said opening being sized to cooperate with an inlet to said fluid regulation control device;
(d) positioning at least a portion of said fluid regulation control device and positioning said outer conduit within said lower housing openings and said inner conduit within said outer conduit such that the inner conduit surface forming said inner conduit opening is located adjacent said inlet to said fluid regulation control device;
(e) securably and sealably attaching the inner conduit surface forming said inner conduit opening to said inlet so as to form a fluid communication relationship between said inner conduit and said inlet;
(f) securably and sealably attaching the surface forming said outer conduit to said lower housing so as to form a fluid communication relationship between any fluids located in a space between said fluid regulation control device and the interior of said lower housing and any fluids located in a space between said inner conduit and said outer conduit; and
(g) sealably and securably attaching an upper housing to said lower housing.

31. The method of claim 30 wherein said step of positioning said fluid regulation control device includes positioning a fluid regulation control device being a purge tee, said upper housing having a sealed upper end.

* * * * *